(12) United States Patent
Chen et al.

(10) Patent No.: US 12,096,084 B2
(45) Date of Patent: Sep. 17, 2024

(54) BROADCAST DIRECTING METHOD, APPARATUS AND SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Yue Chen, Beijing (CN); Jiawei Zuo, Beijing (CN); Linfang Wang, Beijing (CN); Ting Yao, Beijing (CN); Tao Mei, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 18 days.

(21) Appl. No.: 17/999,984

(22) PCT Filed: May 12, 2021

(86) PCT No.: PCT/CN2021/093223
§ 371 (c)(1),
(2) Date: Nov. 28, 2022

(87) PCT Pub. No.: WO2021/238653
PCT Pub. Date: Dec. 2, 2021

(65) Prior Publication Data
US 2023/0209141 A1 Jun. 29, 2023

(30) Foreign Application Priority Data
May 29, 2020 (CN) .......................... 202010477406.4

(51) Int. Cl.
*H04N 21/472* (2011.01)
*G06V 20/40* (2022.01)
(Continued)

(52) U.S. Cl.
CPC ....... *H04N 21/47217* (2013.01); *G06V 20/41* (2022.01); *G06V 20/44* (2022.01);
(Continued)

(58) Field of Classification Search
CPC ......... H04N 21/47217; H04N 21/2187; H04N 21/44008; H04N 21/21805;
(Continued)

(56) References Cited

U.S. PATENT DOCUMENTS 9,600,723 B1 * 3/2017 Pantofaru .............. G06V 10/25
2008/0088706 A1 4/2008 Girgensohn et al.
(Continued)

FOREIGN PATENT DOCUMENTS

CN 102662919 A 9/2012
CN 104581380 A 4/2015
(Continued)

OTHER PUBLICATIONS

"Decision of Rejection", CN Application No. 202010477406.4, Jun. 2, 2022, 8 pp.
(Continued)

*Primary Examiner* — Alazar Tilahun
(74) *Attorney, Agent, or Firm* — Myers Bigel, P.A.

(57) ABSTRACT

The present disclosure relates to a broadcast directing method, apparatus and system, and a non-transitory computer-storable medium, which relate to the technical field of computers. The broadcast directing method includes acquiring a reference video stream from a reference camera position; performing event recognition on the reference video stream to obtain at least one reference event frame
(Continued)

interval; determining a local sequence of each reference event frame interval according to a correspondence relationship between the event and a camera position identification, the local sequence comprising a camera position identification of each frame image of a video to be played corresponding to the reference event frame interval and a frame identification corresponding to the camera position identification; generating a broadcast directing sequence according to the local sequence; and generating a broadcast directing video according to the broadcast directing sequence and a video stream of a camera position.

18 Claims, 7 Drawing Sheets

(51) Int. Cl.
  *G06V 40/16* (2022.01)
  *H04N 21/2187* (2011.01)
  *H04N 21/44* (2011.01)
(52) U.S. Cl.
  CPC ....... *G06V 40/161* (2022.01); *H04N 21/2187* (2013.01); *H04N 21/44008* (2013.01)
(58) Field of Classification Search
  CPC ....... H04N 21/23418; H04N 21/23424; H04N 21/44016; H04N 21/4415; H04N 21/8455; G06V 20/41; G06V 20/44; G06V 40/161
  See application file for complete search history.

(56) References Cited

U.S. PATENT DOCUMENTS

| | | |
|---|---|---|
| 2008/0138029 A1 | 6/2008 | Xu et al. |
| 2012/0209841 A1 | 8/2012 | Saretto et al. |
| 2014/0270684 A1 | 9/2014 | Jayaram et al. |
| 2014/0274353 A1 | 9/2014 | Benson et al. |
| 2014/0333776 A1 | 11/2014 | Dedeoglu et al. |
| 2015/0002665 A1 | 1/2015 | Sentinelli et al. |
| 2015/0116501 A1* | 4/2015 | McCoy ................ H04N 23/661 348/169 |
| 2015/0116502 A1* | 4/2015 | Um ........................ G06T 7/292 348/169 |
| 2015/0128174 A1 | 5/2015 | Rango et al. |
| 2015/0154452 A1 | 6/2015 | Bentley et al. |
| 2016/0098852 A1* | 4/2016 | Senda ..................... G06F 18/22 382/218 |
| 2017/0006328 A1 | 1/2017 | Verticchio |
| 2017/0194035 A1 | 7/2017 | Mahrt et al. |
| 2019/0174122 A1* | 6/2019 | Besley ................. H04N 13/243 |
| 2019/0261055 A1* | 8/2019 | Mun ...................... H04N 23/60 |
| 2020/0053401 A1 | 2/2020 | Obara |
| 2020/0092444 A1 | 3/2020 | An et al. |

FOREIGN PATENT DOCUMENTS

| | | |
|---|---|---|
| CN | 108540817 A | 9/2018 |
| CN | 108632661 A | 10/2018 |
| CN | 109194978 A | 1/2019 |
| CN | 109326310 A | 2/2019 |
| CN | 109714644 A | 5/2019 |
| CN | 110049345 A | 7/2019 |
| CN | 110381366 A | 10/2019 |
| CN | 110798692 A | 2/2020 |
| CN | 110933460 A | 3/2020 |
| CN | 110944123 A | 3/2020 |
| CN | 110996138 A | 4/2020 |
| CN | 111787341 A | 10/2020 |
| WO | 2004014061 A2 | 2/2004 |
| WO | 2014206473 A1 | 12/2014 |
| WO | 2018076998 A1 | 5/2018 |
| WO | 2018166275 A1 | 9/2018 |
| WO | 2018223554 A1 | 12/2018 |

OTHER PUBLICATIONS

"First Office Action and English language translation", CN Application No. 202010477406.4, Sep. 3, 2021, 17 pp.
"International Search Report and English language translation", International Application No. PCT/CN2021/093223, Jul. 30, 2021, 6 pp.
"Second Office Action and English language translation", CN Application No. 202010477406.4, Mar. 3, 2022, 17 pp.
Chen, Jianhui , et al., "Sports Camera Calibration via Synthetic Data", https://arxiv.org/abs/1810.10658v1, Submitted on Oct. 25, 2018], 7 pp.
Qiu, Zhaofan , et al., "Learning Spatio-Temporal Representation with Pseudo-3D Residual Networks", 2017 IEEE International Conference on Computer Vision (ICCV), Venice Italy, Oct. 22, 2017, 9 pp.
"Communication with Supplementary European Search Report", EP Application No. 21812681.1, Feb. 15, 2024, 10 pp.
"Notification to Grant Patent Right for Invention" with English language translation, CN Application No. 202010477406.4, Sep. 1, 2023, 6 pp.
"Third Office Action" with English language translation, CN Application No. 202010477406.4, Jul. 14, 2023, 10 pp.

* cited by examiner

S31: determine an initial local sequence of the ith reference event frame interval according to the correspondence relationship between the event and the camera position identification S32: acquire a video stream from at least one first auxiliary camera position S33: extend the initial local sequence of the ith reference event frame interval by using the video stream from the at least one first auxiliary camera position, to obtain the local sequence of the ith reference event frame interval

Fig. 4

S331: for the case where i is equal to 1, under the condition that there is at least one of $s_i$ and 1 being non-adjacent or $e_i$ and $s_{i+1}$ being non-adjacent, acquire at least one of a video stream between $s_i$ and 1 or a video stream between $e_i$ and $s_{i+1}$ from the at least one first auxiliary camera position as an extension video stream S332: extend the initial local sequence of the ith reference event frame interval by using the extension video stream, to obtain the local sequence of the ith reference event frame interval

Fig. 5a

S331': for the case where i is greater than 1, under the condition that there is at least one of $s_i$ and $E_{i-1}$ being non-adjacent or $e_i$ and $s_{i+1}$ being non-adjacent, acquire at least one of a video stream between $s_i$ and $E_{i-1}$ or a video stream between $e_i$ and $s_{i+1}$ from the at least one first auxiliary camera position as an extension video stream S332': extend the initial local sequence of the ith reference event frame interval by using the extension video stream, to obtain the local sequence of the ith reference event frame interval

Fig. 5b

BROADCAST DIRECTING METHOD, APPARATUS AND SYSTEM

CROSS-REFERENCE TO RELATED APPLICATIONS

The present disclosure is a U.S. National Stage Application under 35 U.S.C. § 371 of International Patent Application No. PCT/CN2021/093223, filed on May 12, 2021, which is based on and claims priority of Chinese application for invention No. 202010477406.4, filed on May 29, 2020, the disclosure of both of which are hereby incorporated into this disclosure by reference in its entirety.

TECHNICAL FIELD

This disclosure relates to the field of computer technologies, and particularly, to a broadcast directing method, apparatus and system, and a non-transitory computer-readable storage medium.

BACKGROUND

In television program production, for a program with a fixed scene, simultaneous shooting using multiple camera positions is often employed, and then video streams from multiple camera positions are edited and fused according to a certain narrative rule to form a multi-angle, multi-shooting scale broadcast directing video, so as to improve comprehensiveness and enjoyment of the program.

For movie and television shooting, there is sufficient time for post-processing and editing after the shooting is completed. But in a television live-streaming scene, video streams of various camera positions are directly transmitted to a video switcher, and under cooperative work of a team, a broadcast directing video meeting live-streaming delay requirements is synthesized according to command of an on-site director. In the process, the on-site director needs to select a video stream of a suitable camera position for output in conjunction with the situation of the live-streaming site. In addition, some live-streaming scenes also need suitable clips to be picked out from multi-path video streams for playback.

Typically, a complete live-streaming broadcast directing team includes a cameraman, an editor, and an on-site director.

The cameraman is distributed at a plurality of places of the live-streaming site, and employs different standards of cameras to provide different forms of site pictures. Cameraman work has certain autonomy, namely, autonomous shooting on the live-streaming site is performed according to a certain principle. In some specific cases, the cameraman is also controlled by instructions of the on-site editor. The editor is located in a broadcast directing vehicle and is responsible for picking out valuable clips from multi-path video streams from the cameraman for playback. Most of the time, he needs to undertake the editing of the multi-path videos alone. The on-site director is located in the broadcast directing vehicle, watches the multi-path real-time video streams and the playback clips provided by the editor, and picks out therefrom suitable materials to generate the broadcast directing video. The on-site director also needs to command the cameraman and the editor to obtain effective raw video materials and brilliantly edited clips.

In the related art, the on-site director artificially picks out suitable video materials in a short time according to the acquired video streams, to synthesize the broadcast directing video.

SUMMARY

According to a first aspect of the present disclosure, there is provided a broadcast directing method, comprising: acquiring a reference video stream from a reference camera position; performing event recognition on the reference video stream to obtain at least one reference event frame interval, each reference event frame interval corresponding to an unique event, and each reference event frame interval comprising frame identifications of a plurality of successive images where a same event occurs; determining a local sequence of each reference event frame interval according to a correspondence relationship between the event and a camera position identification, the local sequence comprising a camera position identification of each frame image of a video to be played corresponding to the reference event frame interval and a frame identification corresponding to the camera position identification; generating a broadcast directing sequence according to the local sequence; and generating a broadcast directing video according to the broadcast directing sequence and a video stream of a camera position corresponding to the camera position identification of the broadcast directing sequence.

In some embodiments, the at least one reference event frame interval comprises an ith reference event frame interval, i being a positive integer, and the determining a local sequence of each reference event frame interval according to a correspondence relationship between the event and a camera position identification comprises: determining an initial local sequence of the ith reference event frame interval according to the correspondence relationship between the event and the camera position identification, a starting frame identification and an ending frame identification of the initial local sequence being a starting frame identification and an ending frame identification of the ith reference event frame interval, respectively; acquiring a video stream from at least one first auxiliary camera position; and extending the initial local sequence of the ith reference event frame interval by using the video stream from the at least one first auxiliary camera position, to obtain the local sequence of the ith reference event frame interval.

In some embodiments, the at least one reference event frame interval further comprises an (i+1)th reference event frame interval, the starting frame identification and the ending frame identification of the ith reference event frame interval being $s_i$ and $e_i$ respectively, and a starting frame identification of the (i+1)th reference event frame interval being $s_{i+1}$, and the extending the initial local sequence of the ith reference event frame interval comprises: for the case where i is equal to 1, under the condition that there is at least one of $s_i$ and 1 being non-adjacent or $e_i$ and $s_{i+1}$ being non-adjacent, acquiring at least one of a video stream between $s_i$ and 1 or a video stream between $e_i$ and $s_{i+1}$, from the at least one first auxiliary camera position, as an extension video stream; and extending the initial local sequence of the ith reference event frame interval by using the extension video stream, to obtain the local sequence of the ith reference event frame interval.

In some embodiments, the at least one reference frame interval further comprises an (i−1)th reference event frame interval, an ending frame identification of the local sequence of the (i−1)th reference event frame interval being $E_{i-1}$, and
} the extending the initial local sequence of the ith reference event frame interval comprises: for the case where i is greater than 1, under the condition that there is at least one of non-adjacent $s_i$ and $E_{i-1}$ or non-adjacent $e_i$ and $s_{i+1}$, acquiring at least one of a video stream between $s_i$ and $E_{i-1}$ or a video stream between $e_i$ and $s_{i+1}$, from the at least one first auxiliary camera position, as an extension video stream; and extending the initial local sequence of the ith reference event frame interval by using the extension video stream, to obtain the local sequence of the ith reference event frame interval.

In some embodiments, the extension video stream is a multipath extension video stream, the multipath extension video stream is from a plurality of first auxiliary camera positions, and the extending the initial local sequence of the ith reference event frame interval comprises: performing face recognition on each path of the multipath extension video stream, to obtain at least one face frame interval corresponding to the path of the multipath extension video stream, each face frame interval corresponding to a unique face recognition result, and each face frame interval comprising frame identifications of a plurality of successive images with a same face recognition result; generating at least one extension frame interval according to the face frame interval of each path of the multipath extension video stream, each extension frame interval comprising at least parts of a plurality of face frame intervals that can be concatenated and correspond to different first auxiliary camera positions; obtaining an extension sequence according to an extension frame interval with a highest number of corresponding first auxiliary camera positions and a highest total number of the frame in the at least one extension frame interval, the extension sequence comprising a camera position identification of each frame image of a video to be played corresponding to the extension frame interval and a frame identification corresponding to the camera position identification; and extending the initial local sequence of the ith reference event frame interval according to the extension sequence, to obtain the local sequence of the ith reference event frame interval.

In some embodiments, the generating at least one extension frame interval according to the face frame interval of the path of the multipath extension video stream comprises: for the multipath extension video stream of each first auxiliary camera position, determining a face frame interval adjacent to the ith reference event frame interval as an initial extension frame interval; starting from the face frame interval adjacent to the ith reference event frame interval, along a direction of a decrease or increase in frame identifications, concatenating at least a part of one face frame interval of another first auxiliary camera position than the first auxiliary camera position that can be concatenated with the initial extension frame interval to the initial extension frame interval, to update the initial extension frame interval; circularly updating the initial extension frame interval until there are no longer the face frame interval of the other first auxiliary camera position than the first auxiliary camera position corresponding to the initial extension frame interval that can be concatenated with the initial extension frame interval; and determining the updated initial extension frame interval as the extension frame interval.

In some embodiments, the at least one reference event frame interval comprises an ith reference event frame interval and an (i+1)th reference event frame interval, i being an integer greater than or equal to 1, and a starting frame identification and an ending frame identification of the ith reference event frame interval being $s_i$ and $e_i$ respectively, a starting frame identification of the (i+1)th reference event frame interval being $s_{i+1}$, and the determining a local sequence of each reference event frame interval according to a correspondence relationship between the event and a camera position identification comprises: determining an initial local sequence of the ith reference event frame interval according to the correspondence relationship between the event and the camera position identification, a starting frame identification and an ending frame identification of the initial local sequence being $s_i$ and $e_i$ respectively; in the case of $e_i$ and $s_{i+1}$ being non-adjacent, determining a playback type according to the event corresponding to the ith reference event frame interval; acquiring at least one path of playback video stream corresponding to the playback type; and extending the initial local sequence according to the at least one path of playback video stream, to obtain the local sequence of the ith reference event frame interval.

In some embodiments, the extending the initial local sequence comprises: generating at least one playback sequence according to the at least one path of playback video stream, each playback sequence comprising a camera position identification of each frame image located between $e_i$ and $s_{i+1}$ and a frame identification corresponding to the camera position identification; and extending the initial local sequence by using the at least one playback sequence.

In some embodiments, the playback type comprises a first playback type, and the generating at least one playback sequence according to the at least one path of playback video stream comprises: under the condition that the playback type is the first playback type, performing event recognition on the at least one path of playback video stream, to obtain at least one auxiliary event frame interval, the auxiliary event frame interval comprising frame identifications of a plurality of successive images where an event corresponding to the ith reference event frame interval occurs; and generating the at least one playback sequence according to the at least one auxiliary event frame interval.

In some embodiments, the generating at least one playback sequence according to the at least one auxiliary event frame interval comprises: ranking the at least one auxiliary event frame interval according to a total number of the frame and a weight of each auxiliary event frame interval; and generating the at least one playback sequence according to a result of the ranking.

In some embodiments, the playback type comprises a first playback type, and the acquiring at least one path of playback video stream corresponding to the playback type comprises: under the condition that the playback type is the first playback type, acquiring a video stream between $s_i$–m and $e_i$+n from the at least one first auxiliary camera position, as the at least one path of playback video stream, m and n being both integers greater than or equal to 0.

In some embodiments, the playback type comprises a second playback type, and the acquiring at least one path of playback video stream corresponding to the playback type comprises: under the condition that the playback type is the second playback type, acquiring a camera position angle corresponding to each frame image between $s_i'$ and $e_i'$ according to the reference video stream; according to each camera position angle, determining an area where an event corresponding to the ith reference event frame interval occurs; and acquiring a video stream between $s_i$ and $e_i$ from at least one second auxiliary camera position in the area, as the at least one path of playback video stream.

In some embodiments, the at least one reference event frame interval comprises an ith reference event frame interval and an (i+1)th reference event frame interval, i being an integer greater than or equal to 1, and the generating a broadcast directing sequence comprises: generating a supplement sequence under the condition that an ending frame identification $E_i$ of the local sequence of the ith reference event frame interval is non-adjacent to a starting frame identification $S_{i+1}$ of the local sequence of the (i+1)th reference event frame interval, the supplement sequence comprising a camera position and a frame identification of each frame image located between $E_i$ and $S_{i+1}$, and the camera position of each frame image located between $E_i$ and $S_{i+1}$ being a third auxiliary camera position; and merging the local sequence and the supplement sequence to obtain the broadcast directing sequence.

In some embodiments, the reference position is used for providing a close-up video stream of a dribbling player, the first auxiliary camera position is used for providing a close-up video stream at a different angle on a pitch, the second auxiliary camera position is used for providing a standard video stream at a different angle on the pitch, and the third auxiliary camera position is used for providing a standard video stream at a viewing angle of a spectator.

In some embodiments, the generating a broadcast directing video comprises: acquiring the frame image corresponding to the broadcast directing sequence according to the broadcast directing sequence and the video stream of the camera position corresponding to the camera position identification of the broadcast directing sequence; and coding the frame image to obtain the broadcast directing video.

According to a second aspect of the present disclosure, there is provided a broadcast directing apparatus, comprising: an acquisition module configured to acquire a reference video stream from a reference camera position; an event recognition module configured to perform event recognition on the reference video stream to obtain at least one reference event frame interval, each reference event frame interval corresponding to an unique event, and each reference event frame interval comprising frame identifications of a plurality of successive images where a same event occurs; a determination module configured to determine a local sequence of each reference event frame interval according to a correspondence relationship between the event and a camera position identification, the local sequence comprising a camera position identification of each frame image of a video to be played corresponding to the reference event frame interval and a frame identification corresponding to the camera position identification; a first generation module configured to generate a broadcast directing sequence according to the local sequence; and a second generation module configured to generate a broadcast directing video according to the broadcast directing sequence and a video stream of a camera position corresponding to the camera position identification of the broadcast directing sequence.

According to a third aspect of the present disclosure, there is provided a broadcast directing apparatus, comprising: a memory; and a processor coupled to the memory, the processor being configured to perform, based on instructions stored in the memory, the broadcast directing method according to any of the above embodiments.

According to a fourth aspect of the present disclosure, there is provided a broadcast directing system, comprising: the broadcast directing apparatus according to any of the above embodiments; and at least one camera configured to generate a video stream and transmit the video stream to the broadcast directing apparatus.

According to a fifth aspect of the present disclosure, there is provided a non-transitory computer-storable medium having thereon stored computer program instructions which, when executed by a processor, implement the broadcast directing method according to any of the above embodiments.

BRIEF DESCRIPTION OF THE DRAWINGS

The accompanying drawings, which constitute a part of this description, illustrate embodiments of the present disclosure and together with the description, serve to explain the principles of the present disclosure.

The present disclosure can be more clearly understood from the following detailed description taken with reference to the accompanying drawings, in which:

FIG. 4 is a flow diagram illustrating determining a local sequence of each reference event frame interval according to some embodiments of the present disclosure;

FIG. 5a is a flow diagram illustrating extending an initial local sequence of an ith reference event frame interval according to some embodiments of the present disclosure;

FIG. 5b is a flow diagram illustrating extending an initial local sequence of an ith reference event frame interval according to other embodiments of the present disclosure;

DETAILED DESCRIPTION

Figure 1:
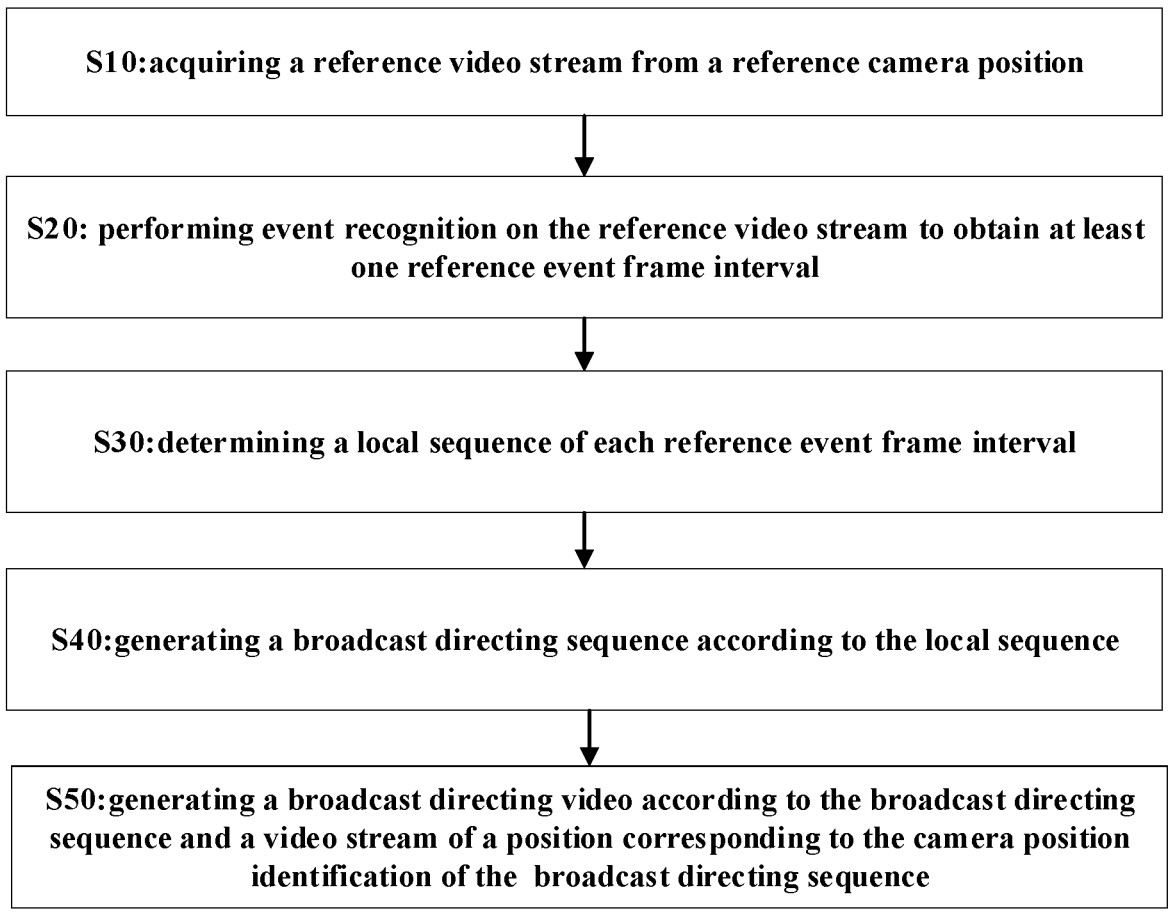
FIG. 1 is a flow diagram illustrating a broadcast directing method according to some embodiments of the present disclosure.

Various exemplary embodiments of the present disclosure will now be described in detail with reference to the accompanying drawings. It should be noted that: relative arrangements, numerical expressions and numerical values of components and steps set forth in these embodiments do not limit the scope of the present disclosure unless specifically stated otherwise.

Meanwhile, it should be understood that sizes of portions shown in the drawings are not drawn to actual scales for ease of description.

The following description of at least one exemplary embodiment is merely illustrative in nature and is in no way intended to limit this disclosure and its applications or uses.

Techniques, methods, and devices known to one of ordinary skill in the related art may not be discussed in detail but are intended to be part of the specification where appropriate.

In all examples shown and discussed herein, any specific value should be construed as exemplary only and not as limiting. Thus, other examples of the exemplary embodiments can have different values.

It should be noted that: similar reference numbers and letters refer to similar items in the following drawings, and therefore, once a certain item is defined in one drawing, it need not be discussed further in subsequent drawings.

In related art, labor cost is high, and real-time performance and accuracy are poor. Based on this, the present disclosure provides a broadcast directing method, capable of reducing the labor cost and improving the real-time performance and accuracy of the broadcast directing.

The broadcast directing method according to some embodiments of the present disclosure will be described in detail below in conjunction with FIGS. 1 and 2.

FIG. 1 is a flow diagram illustrating a broadcast directing method according to some embodiments of the present disclosure.

Figure 2:
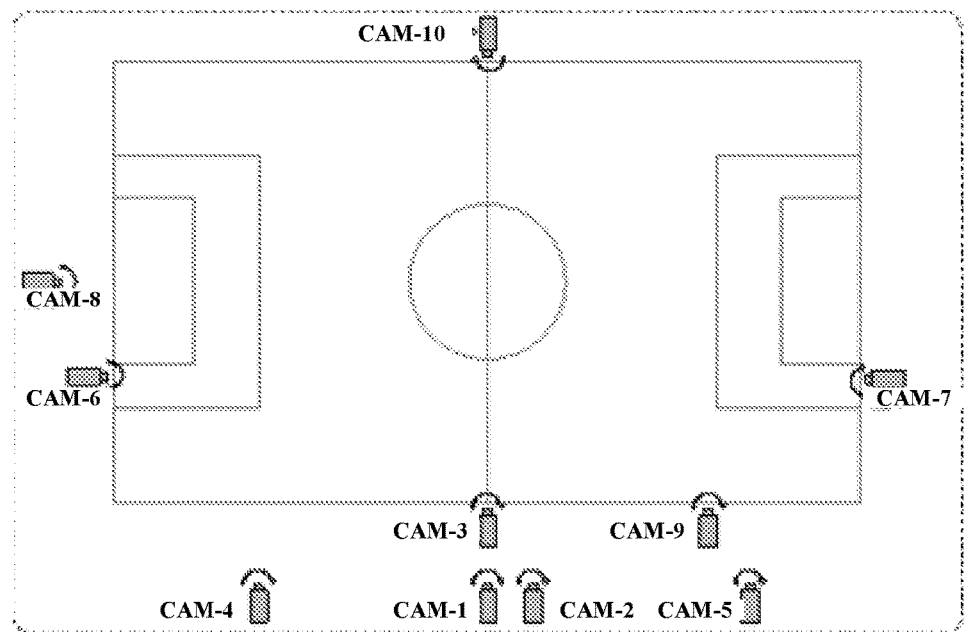
FIG. 2 is a diagram illustrating distribution of camera positions on a live-streaming site according to some embodiments of the present disclosure.

FIG. 2 is a diagram illustrating distribution of camera positions on a live-streaming site according to some embodiments of the present disclosure.

As shown in FIG. 1, the broadcast directing method comprises: step S10, acquiring a reference video stream from a reference camera position; step S20, performing event recognition on the reference video stream to obtain at least one reference event frame interval; step S30, determining a local sequence of each reference event frame interval; step S40, generating a broadcast directing sequence according to the local sequence; and step S50, generating a broadcast directing video according to the broadcast directing sequence and a video stream of a camera position corresponding to the camera position identification of the broadcast directing sequence. For example, the broadcast directing method is performed by a broadcast directing apparatus.

According to the present disclosure, by means of the event recognition, the local sequence of each reference event frame interval is obtained, and broadcast directing is performed according to the local sequence, so that automatic broadcast directing is realized, which reduces the labor cost and improves the real-time performance and accuracy of the broadcast directing.

In addition, by realizing the automatic broadcast directing, work difficulty of an on-site broadcast directing team is greatly reduced, an on-site director only needs to command a cameraman to shoot suitable video materials, and the generation and the output of the broadcast directing video are efficiently and automatically completed by a computer. Moreover, computer code has customizability, and is convenient to modify and customize broadcast directing logic, so that the output of thousands of broadcast directing videos for thousands of people can be realized, which greatly enriches the selection of spectators.

In the step S10, the reference video stream from the reference camera position is acquired. In some embodiments, the reference video stream from the reference camera position is acquired through an input interface.

For example, the reference camera position is a camera CAM-2 as shown in FIG. 2. The camera CAM-2 is a 4K camera, which provides a close-up video stream of a dribbling player. A lens of the camera CAM-2 is a lens of more than 100× and is a stand close-up camera position. In some embodiments, a camera position identification of the camera CAM-2 is 2. For example, each camera of FIG. 2 is located on a pitch.

In the step S20, the event recognition is performed on the reference video stream, to obtain the at least one reference event frame interval. Each reference event frame interval corresponds to an unique event. Each reference event frame interval comprises frame identifications of a plurality of successive images where a same event occurs.

In some embodiments, the event recognition is performed using a video event recognition algorithm. For example, the event recognition algorithm includes, but is not limited to, a P3D ResNet (Pseudo-3D Residual Networks) algorithm.

For example, the event recognition on the reference video stream is achieved in the following way.

Firstly, an event recognition result of each frame image in the reference video stream is obtained by using the video event recognition algorithm. In some embodiments, an event recognition result identification of each frame image is $P=[p_1, \ldots, p_{cls}]$. $p_{cls}$ denotes a probability that an event with an event identification of cls occurs or a probability that no event occurs. For example, in a football live-streaming scene, a value of cls is an integer greater than or equal to 1 and less than or equal to 7, which respectively denotes six different events and no event.

In some embodiments, the event in the football live-streaming scene includes, but is not limited to, a shot, a free kick, a corner kick, a goal kick, a throw-in, and a player conflict.

Secondly, smoothing operation is performed on the event recognition result of each frame image in the reference video stream, to obtain a smoothed event recognition result of each frame image. For example, by using a time window with a length of t seconds, smoothing operation with a stride of 1 frame is performed on the event recognition result of each frame image. In some embodiments, t is equal to 0.5. Through the smoothing operation, the error of the event recognition can be reduced, so that the event recognition is more accurate, and therefore, the accuracy of the broadcast directing is improved.

For example, the smoothed event recognition result is denoted as $$\overline{P} = \frac{\sum_{j=1}^{m} P}{m}, m = f \times t.$$

f is a frame rate of the reference video stream. $\overline{P}$ denotes a smoothed event recognition result of an intermediate frame image between a 1st frame image and an mth frame image.

Then, for each frame image, an event corresponding to a maximum probability in the smoothed event recognition result or no event is determined as a final event recognition result of each frame image.

Finally, the frame identifications of the plurality of successive images where the same event occurs are merged, to obtain the at least one reference event frame interval. In some embodiments, a plurality of reference event frame intervals corresponding to the same event, spaced with a plurality of frames of no-event images, can also be merged into one reference event frame interval.

Figure 3:
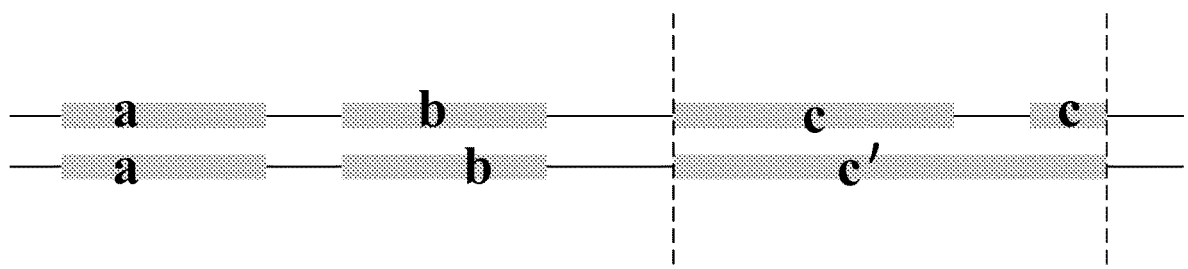
FIG. 3 is a schematic diagram illustrating merging reference event frame intervals according to some embodiments of the present disclosure.

FIG. 3 is a schematic diagram illustrating merging reference event frame intervals according to some embodiments of the present disclosure.

As shown in FIG. 3, a, b, and c denote reference event frame intervals of different events, respectively. For the reference video stream, there are two reference event frame intervals c. There is spaced with a plurality of frames of no-event images between the two reference event frame intervals c. For example, under the condition that a number of the frame of the spaced no-event images is less than or equal to a preset threshold, the two reference event frame intervals c are merged into one event frame interval c'. In some embodiments, the preset threshold is f×$t_1$. For example, $t_1$ is 0.5 second.

Returning to FIG. 1, after the at least one reference event frame interval is obtained, the step S30 is performed.

In the step S30, a local sequence of each reference event frame interval is determined according to the correspondence relationship between the event and the camera position identification. The local sequence comprises a camera position identification of each frame image of a video to be played corresponding to the reference event frame interval and a frame identification corresponding to the camera position identification.

For example, the at least one reference event frame interval comprises an ith reference event frame interval. i is a positive integer. In some embodiments, a local sequence of the ith reference event frame interval can be denoted as $C_i = \{c_{S_i}(k,z), \ldots, c_j(k,z), \ldots, c_{E_i}(k,z)\}$. $S_i$ and $E_i$ are a starting frame identification and an ending frame identification of the local sequence of the ith reference event frame interval, respectively. j is a frame identification of a video to be played, and j is greater than or equal to $S_i$ and less than or equal to $E_i$. k is a camera position identification, and z is a frame identification of a video stream corresponding to the camera position identification. $c_j(k,z)$ denotes that a jth frame image of the video to be played corresponding to the ith reference event frame interval is a zth frame image from a camera position with a camera position identification of k.

For example, Table 1 shows a correspondence relationship between an event in a football live-streaming scene and a camera position identification.

TABLE 1 a correspondence relationship between an event and a camera position identification

| Event | Shot | Corner kick | Free kick | Player conflict | Goal kick | Throw-in |
|---|---|---|---|---|---|---|
| Camera position identification | 1 | 2 | 2 | 1 | 2 | 2 |

As shown in the Table 1, in the football live-streaming scene, the shot, the corner kick, the free kick, the player conflict, the goal kick and the throw-in correspond to the camera position identifications 1, 2, 2, 1, 2 and 2, respectively. For example, a camera position with the camera position identification 1 is a camera CAM-1 as shown in FIG. 2. The camera CAM-1 is a 4K camera, for providing a standard video stream at a viewing angel of a spectator. The camera CAM-1 provides a standard lens, which is a stand panorama camera position.

For example, the step S30 is implemented by steps shown in FIG. 4.

FIG. 4 is a flow diagram illustrating determining a local sequence of each reference event frame interval according to some embodiments of the present disclosure.

As shown in FIG. 4, the determining a local sequence of each reference event frame interval comprises steps S31 to S33.

In the step S31, an initial local sequence of the ith reference event frame interval is determined according to the correspondence relationship between the event and the camera position identification. A starting frame identification and an ending frame identification of the initial local sequence are the starting frame identification and the ending frame identification of the ith reference event frame interval, respectively.

For example, the event of the ith reference event frame interval is a corner kick. According to the Table 1, the camera position identification corresponding to the corner kick is 2.

In some embodiments, the starting frame identification and the ending frame identification of the ith reference event frame interval are $s_i$ and $e_i$, respectively. The initial local sequence of the ith reference event frame interval is denoted as $c_i = \{c_{s_i}(2,s_i), \ldots, c_j(2,j), \ldots, c_{e_i}(2,e_i)\}$. $c_j(2,j)$ denotes that a jth frame image of a video to be played corresponding to the initial local sequence is a jth frame image from a video stream with the camera position identification of 2.

In the step S32, a video stream from at least one first auxiliary camera position is acquired. For example, the first auxiliary camera position is used for providing a close-up video stream at a different angle on the pitch.

For example, in the football live-streaming scene, the first auxiliary camera position is cameras CAM-3, CAM-7, CAM-8 and CAM-10 shown in FIG. 2, whose camera position identifications are 3, 7, 8 and 10, respectively. The cameras CAM-3, CAM-7, CAM-8 and CAM-10 are all 4K cameras and provide a lens of more than 80×, a lens of more than 40×, a lens of more than 80× and a lens of more than 80×, respectively. The cameras CAM-3, CAM-7 and CAM-10 are all ground camera positions, and the camera CAM-8 is a stand camera position.

In the step S33, the initial local sequence of the ith reference event frame interval is extended by using the video stream from the at least one first auxiliary camera position, to obtain the local sequence of the ith reference event frame interval.

FIG. 5a is a flow diagram illustrating extending an initial local sequence of an ith reference event frame interval according to some embodiments of the present disclosure.

In some embodiments, the at least one reference event frame interval further comprises an (i+1)th reference event frame interval, a starting frame identification of the (i+1)th reference event frame interval being $s_{i+1}$.

As shown in FIG. 5a, the extending an initial local sequence of the ith reference event frame interval comprises: steps S331 to S332.

In the step S331, for the case where i is equal to 1, under the condition that there is at least one of $s_i$ and 1 being non-adjacent or $e_i$ and $s_{i+1}$ being non-adjacent, at least one of a video stream between $s_i$ and 1 or a video stream between $e_i$ and $s_{i+1}$ from the at least one first auxiliary camera position is acquired, as an extension video stream. For example, non-adjacent here refers to a difference between $s_i$ and 1 or a difference between $s_{i+1}$ and $e_i$ being greater than a preset difference. In some embodiments, the preset difference is 0 or f×$t_2$. For example, $t_2$ is 2 seconds.

In the step S332, the initial local sequence of the ith reference event frame interval is extended by using the extension video stream, to obtain the local sequence of the ith reference event frame interval.

FIG. 5b is a flow diagram illustrating extending an initial local sequence of the ith reference event frame interval according to other embodiments of the present disclosure.

In some embodiments, the at least one reference frame interval further comprises an (i−1)th reference event frame interval, an ending frame identification of the local sequence of the (i−1)th reference event frame interval being $E_{i-1}$.

As shown in FIG. 5b, the extending an initial local sequence of the ith reference event frame interval comprises steps S331' to S332'.

In the step S331', for the case where i is greater than 1, under the condition that there is at least one of $s_i$ and $E_{i-1}$ being non-adjacent or $e_i$ and $s_{i+1}$ being non-adjacent, at least one of a video stream between $s_i$ and $E_{i-1}$ or a video stream between $e_i$ and $s_{i+1}$ from the at least one first auxiliary camera position is acquired as an extension video stream. For example, non-adjacent here refers to a difference between $s_i$ and $E_{i-1}$ or a difference between $s_{i+1}$ and $e_i$ being greater than a preset difference. In some embodiments, the preset difference is 0 or $\times t_2$. For example, $t_2$ is 2 seconds.

In some embodiments, under the condition that $e_i$ and $s_{i+1}$ are non-adjacent and the difference between $s_{i+1}$ and $e_i$ is greater than the preset difference, a video stream between $e_i$ and a sum of $e_i$ and the preset value from the at least one first auxiliary camera position is acquired as the extension video stream.

In the step S332', the initial local sequence of the ith reference event frame interval is extended by using the extension video stream, to obtain the local sequence of the ith reference event frame interval.

A process of extending the initial local sequence of the ith reference event frame interval will be described in detail below in conjunction with FIGS. 6a and 6b.

Figure 6A:
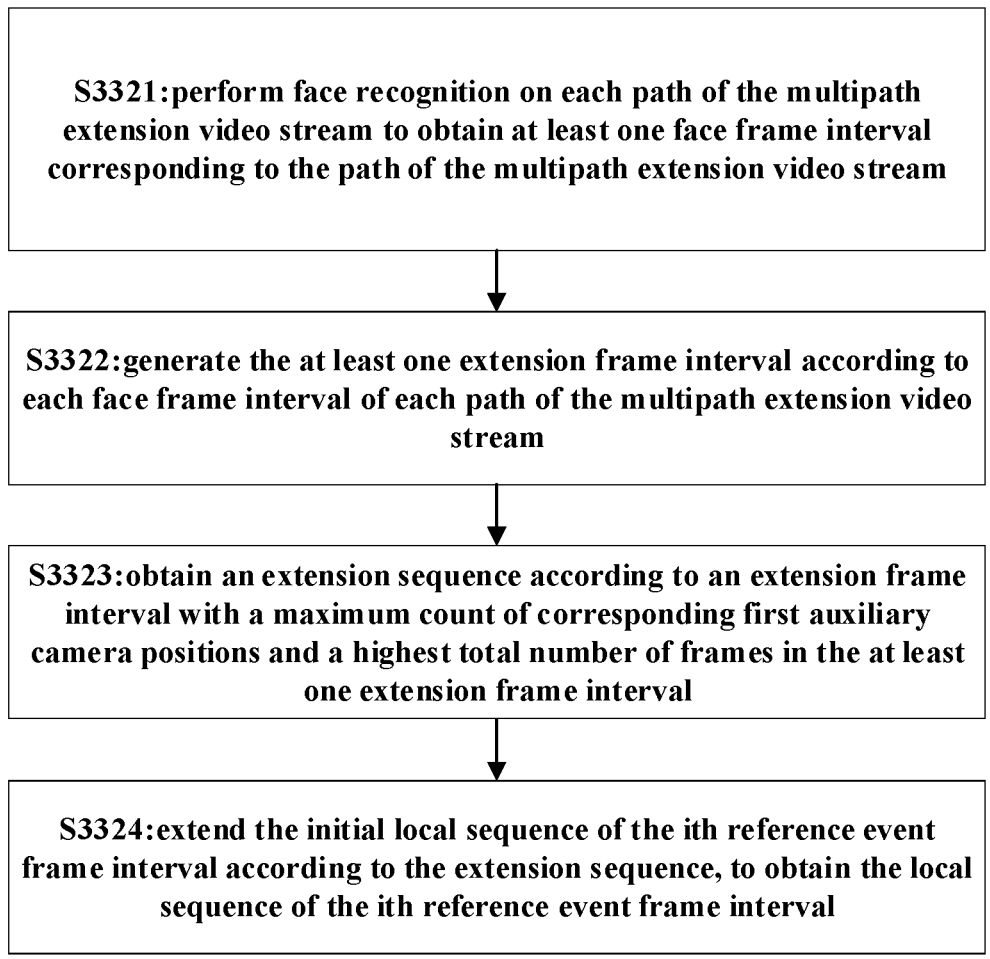
FIG. 6a is a flow diagram illustrating extending an initial local sequence of an ith reference event frame interval according to some embodiments of the present disclosure.

FIG. 6a is a flow diagram illustrating extending an initial local sequence of the ith reference event frame interval according to some embodiments of the present disclosure.

Figure 6B:
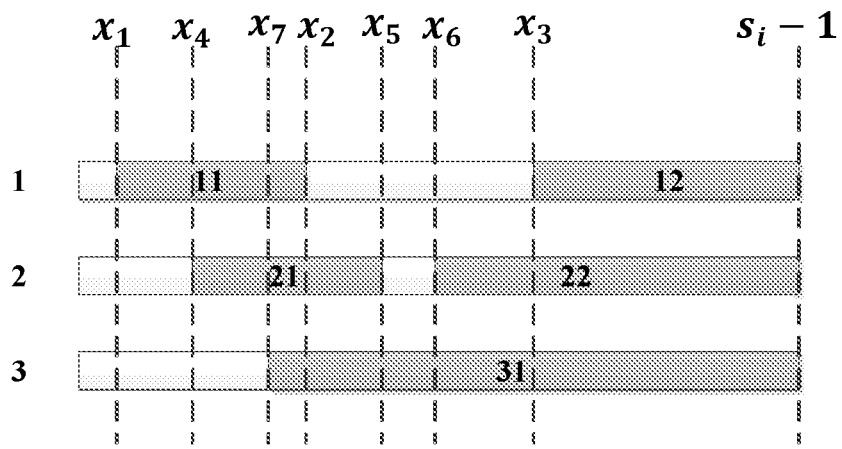
FIG. 6b is a schematic diagram illustrating generating at least one extension frame interval according to some embodiments of the present disclosure.

FIG. 6b is a schematic diagram illustrating generating at least one extension frame interval according to some embodiments of the present disclosure.

For example, the extension video stream is a multipath extension video stream, and the multipath extension video stream is from one same frame interval of a plurality of first auxiliary camera positions.

As shown in FIG. 6a, the extending an initial local sequence of the ith reference event frame interval comprises steps S3321 to S3324.

In the step S3321, face recognition is performed on each path of the multipath extension video stream, to obtain at least one face frame interval corresponding to the path of the multipath extension video stream. Each face frame interval corresponds to an unique face recognition result. Each face frame interval comprises frame identifications of a plurality of successive images with a same face recognition result. In some embodiments, a total number of frames of each face frame interval is greater than a preset total number of frames. For example, the preset total number of frames is $f \times t_2$. For example, $t_2$ is 2 seconds. By controlling the total number of frames of each face frame interval, watching experience of spectators can be improved.

In some embodiments, the face recognition is performed by using a face detection SDK (Software Development Kit) that is provided by a JingDong AI open platform Neuhub, to obtain a face recognition result of each frame image of each path of the multipath extension video stream. Further, the at least one face frame interval is obtained according to the plurality of frame identifications of the plurality of successive frame images with the same face recognition result. For example, the face recognition result of each frame image is a face attribute included in the frame image. The face attribute includes, but is not limited to, a coach, substitute, and linesman.

For example, for the case of $s_i$ and $E_{i-1}$ being non-adjacent or $s_i$ and 1 being non-adjacent, there are extension video streams 1, 2, and 3 as shown in FIG. 6 b, which are from the first auxiliary camera positions shown in FIG. 2 with the camera position identifications 3, 7, 8, respectively.

Different paths of the multipath extension video stream are from different first auxiliary camera positions. An extension video stream 1 corresponds to a face frame interval 11 and a face frame interval 12. The face frame interval 11 is $[x_1,x_2]$, and the face frame interval 12 is $[x_3,s_i-1]$. An extension video stream 2 corresponds to a face frame interval 21 and a face frame interval 22. The face frame interval 21 is $[x_4,x_5]$, and the face frame interval 22 is $[x_6,s_i-1]$. An extension video stream 3 corresponds to a face frame interval 31, and the face frame interval 31 is $[x_7,s_i-1]$. $x_1<x_4<x_7<x_2<x_5<x_6<x_3<s_i-1$.

In the step S3322, the at least one extension frame interval is generated according to the face frame interval of the path of the multipath extension video stream. Each extension frame interval comprises at least parts of a plurality of face frame intervals that can be concatenated and correspond to different first auxiliary camera positions. That can be concatenated here refers to two face frame intervals being adjacent or overlapped.

For example, the generating at least one extension frame interval according to each face frame interval of each path of extension video stream is implemented in the following way.

Firstly, for the extension video stream of each first auxiliary camera position, a face frame interval adjacent to the ith reference event frame interval is determined as an initial extension frame interval.

For example, for the extension video stream 1 shown in FIG. 6b, the face frame interval 12 is determined as the initial extension frame interval.

Secondly, starting from the face frame interval adjacent to the ith reference event frame interval, along a direction of a decrease or increase in frame identifications, at least a part of one face frame interval of another first auxiliary camera position than the first auxiliary camera position that can be concatenated with the initial extension frame interval is concatenated to the initial extension frame interval, to update the initial extension frame interval.

For example, in the case of $s_i$ and $E_{i-1}$ being non-adjacent or $s_i$ and 1 being non-adjacent, for the extension video stream 1 shown in FIG. 6b, starting from the face frame interval 12, along a direction of a decrease in frame identifications, a part $[x_7,x_3-1]$ of the face frame interval 31 of another first auxiliary camera position that can be concatenated with the face frame interval 12 is concatenated to the initial extension frame interval, to update the initial extension frame interval.

And then, the initial extension frame interval is circularly updated until there is no longer the face frame interval of the other first auxiliary camera position than the first auxiliary camera position corresponding to the initial extension frame interval that can be concatenated with the initial extension frame interval.

For example, in the case of $s_i$ and $E_{i-1}$ being non-adjacent or $s_i$ and 1 being non-adjacent, for the extension video stream 1 shown in FIG. 6b, the initial extension frame interval is circularly updated, and it can be continued that a part $[x_4,x_7-1]$ of the face frame interval 21 of another first auxiliary camera position that can be concatenated with the part $[x_7,x_3-1]$ of the face frame interval 31 is concatenated to the initial extension frame interval, to implement the updating of the initial extension frame interval $[x_3,s_i-1]$.

Finally, the updated initial extension frame interval is determined as the extension frame interval.

For example, in the case of $s_i$ and $E_{i-1}$ being non-adjacent or $s_i$ and 1 being non-adjacent, for the extension video stream 1 shown in FIG. 6b, one extension frame interval obtained by concatenating the part $[x_4,x_7-1]$ of the face frame interval 21, the part $[x_7,x_3-1]$ of the face frame interval 31, and all $[x_3,s_i-1]$ of the face frame interval 12, can be determined.

In the step S3323, an extension sequence is obtained according to an extension frame interval with a highest number of corresponding first auxiliary camera positions and a highest total number of the frame in the at least one extension frame interval. The extension sequence comprises a camera position identification of each frame image of a video to be played corresponding to the extension frame interval and a frame identification corresponding to the camera position identification.

For example, in the case of $s_i$ and $E_{i-1}$ being non-adjacent or $s_i$ and 1 being non-adjacent, for the extension video stream 1 shown in FIG. 6b, there are a highest number of corresponding first auxiliary camera positions and a highest total number of the frame in the one extension frame interval obtained by concatenating the part $[x_4,x_7-1]$ of the face frame interval 21, the part $[x_7,x_3-1]$ of the face frame interval 31, and all $[x_3,s_i-1]$ of the face frame intervals 12. An extension sequence is obtained from the extension frame interval.

For example, the obtained extension sequence is $\{c_{x_4}(7, x_4), \ldots, c_{x_7-1}(7,x_7-1), c_{x_7}(8,x_7) \ldots, c_{x_3-1}(8,x_3-1), c_{x_3}(3,x_3), \ldots, c_{s_i-1}(2,s_i-1)\}$.

In the step S3324, the initial local sequence of the ith reference event frame interval is extended according to the extension sequence, to obtain the local sequence of the ith reference event frame interval.

For example, the local sequence of the ith reference event frame interval obtained by the extending is $\{c_{x_4}(7,x_4), \ldots, c_{x_7-1}(7,x_7-1), c_{x_7}(8,x_7) \ldots, c_{x_3-1}(8,x_3-1), c_{x_3}(3,x_3), \ldots, c_{s_i-1}(2,s_i-1), c_{s_i}(2,s_i), \ldots, c_j(2, j), \ldots c_{e_i}(2,e_i)\}$.

For example, for the case of $e_i$ and $s_{i+1}$ being non-adjacent, the extending can also be performed along a direction of an increase in frame identifications to obtain an extension sequence. The extension sequence is used for extending the initial local sequence after $c_{e_i}(2, e_i)$.

In some embodiments, for the case of $e_i$ and $s_{i+1}$ being non-adjacent, considering that a certain reaction time will be reserved for a cameraman, a starting frame identification of the extension sequence in this case is typically a frame identification separated from the ending frame identification of the ith event frame interval by a certain number of frames. And a sequence between the starting frame identification of the extension sequence and the ending frame identification of the ith event frame interval is supplemented by using a sequence of corresponding frame images of a third auxiliary camera position.

For example, the third auxiliary camera position is used for providing a standard video stream at a viewing angle of a spectator. In some embodiments, the third auxiliary camera position is the camera CAM-1 of FIG. 2 in the football live-streaming scene. The camera CAM-1 is the 4K camera, which provides a standard lens and is a stand panorama camera position.

In some embodiments, in the case of both $s_i$ and $E_{i-1}$ being non-adjacent and $e_i$ and $s_{i+1}$ being non-adjacent, or both $s_i$ and 1 being non-adjacent and $e_i$ and $s_{i+1}$ being non-adjacent, two extension sequences are obtained simultaneously, to correspondingly extend the initial local sequence simultaneously.

Figure 7:
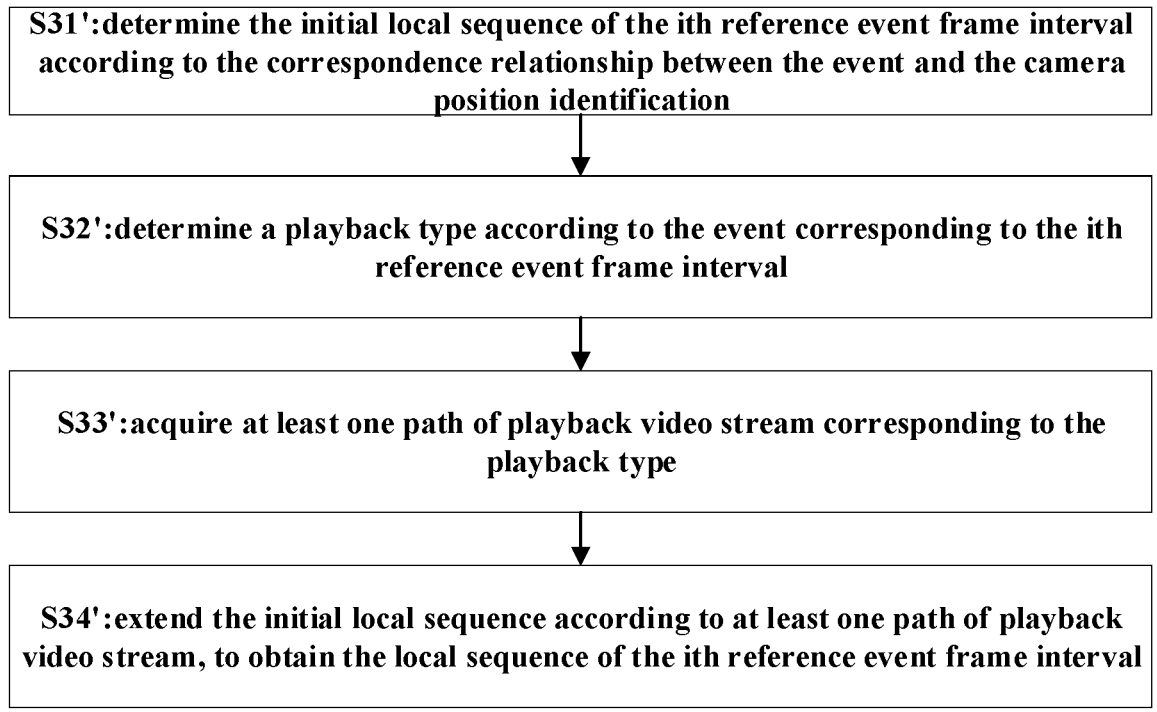
FIG. 7 is a flow diagram illustrating determining a local sequence of each reference event frame interval according to other embodiments of the present disclosure.

For example, the step S30 of determining a local sequence of each reference event frame interval can also be implemented by steps shown in FIG. 7.

FIG. 7 is a flow diagram illustrating determining a local sequence of each reference event frame interval according to other embodiments of the present disclosure.

As shown in FIG. 7, the determining a local sequence of each reference event frame interval comprises steps S31' to S34'.

In the step S31', the initial local sequence of the ith reference event frame interval is determined according to a correspondence relationship between the event and the camera position identification. The starting frame identification and the ending frame identification of the initial local sequence are $s_i$ and $e_i$, respectively.

In the step S32', in the case of $e_i$ and $s_{i+1}$ being non-adjacent, a playback type is determined according to the event corresponding to the ith reference event frame interval. For example, in the football live-streaming scene, the playback type includes a first playback type and a second playback type. In some embodiments, the first playback type is close-up camera position slow playback and the second playback type is standard camera position normal playback.

For example, under the condition that the event is the player conflict, the playback type is the close-up camera position slow playback. Under the condition that the event is the shot, corner kick, or free kick, the playback type is the standard camera position normal playback.

In the step S33', at least one path of playback video stream corresponding to the playback type is acquired.

For example, under the condition that the playback type is the first playback type, a video stream between $s_i-m$ and $e_i+n$ from the at least one first auxiliary camera position is acquired as a playback video stream, where m and n are both integers greater than or equal to 0. In general, since there is the case of a close-up camera position being shaded so that it cannot be guaranteed that all close-up camera positions can shoot pictures of the same event when the event occurs, certain ranges will be each added before and after the starting frame identification and the ending frame identification of the ith event frame interval, to obtain a playback video stream.

For example, under the condition that the playback type is the second playback type, a camera position angle between $s_i'$ and $e_i'$ that corresponds to each frame image is acquired according to the reference video stream. Further, an area where the event corresponding to the ith reference event frame interval occurs is determined according to each camera position angle. Therefore, a video stream located between $s_i$ and $e_i$ of at least one second auxiliary camera position of the area is acquired as a playback video stream. For example, a value range of the camera position angle is [−90, 90], with a unit of degree.

For example, the second auxiliary camera position is used for providing a standard video stream at a different angle on the pitch. In some embodiments, the second auxiliary camera position is cameras CAM-4, CAM-5, CAM-6, and CAM-9 in FIG. 2. The cameras CAM-4, CAM-5, CAM-6 and CAM-9, whose camera position identifications are respectively 4, 5, 6 and 9, are all 4K cameras and provide standard lenses. The camera CAM-4 and the camera CAM-6 are a left-stand offside camera position and a left ground camera position, respectively. The camera CAM-5 and the camera CAM-9 are a right-stand offside camera position and a right ground camera position, respectively.

For example, the determining an area where the event occurs is implemented in the following way.

Firstly, a camera position angle sequence $A=[a_{s_i}, \ldots, a_{e_i}]$ is generated according to camera position angles.

Then, a unary linear regression equation $a=k \times x+b$ of the camera position angle sequence A is calculated, wherein a is an angle, and x is an index value x of the angle sequence A, and $x \in [0, e_i-s_i)$, $x \in N$. The unary linear equation simply describes a change process of a camera position angle of the reference camera position within the ith event frame interval.

For example, under the condition that k×b is greater than 0 (k and b are both positive or k and b are both negative), the area where the event occurs is in a certain half pitch area. Under the condition that k is positive and b is positive, the camera position angle at the beginning of the event is biased toward a right half pitch area, and the camera position angle gradually shifts to the right as the event occurs. Under the condition that k is negative and b is negative, the camera position angle at the beginning of the event is shifted toward a left half pitch area, and the camera position angle is gradually shifted to the left as the event occurs.

Under the condition that k×b is less than 0 (one of k and b is positive and the other is negative), the half pitch is crossed when the event occurs. For the event of crossing the half pitch, it is considered that it poses no threat to a goal so that no playback is performed.

In the step S34', the initial local sequence is extended according to at least one path of playback video stream, to obtain the local sequence of the ith reference event frame interval.

For example, the extending the initial local sequence according to at least one path of playback video stream is implemented in the following way.

Firstly, at least one playback sequence is generated according to the at least one path of playback video stream. Each playback sequence comprises a camera position identification of each frame image located between $e_i$ and $s_{i+1}$ and a frame identification corresponding to the camera position identification.

For example, under the condition that the playback type is the first playback type, the event recognition is performed on the at least one path of playback video stream, to obtain at least one auxiliary event frame interval. Further, the at least one playback sequence is generated according to the at least one auxiliary event frame interval. The auxiliary event frame interval comprises frame identifications of a plurality of successive images where the event corresponding to the ith reference event frame interval occurs.

For example, the at least one auxiliary event frame interval is ranked, according to a total number of the frame and a weight of each auxiliary event frame interval. Further, the at least one playback sequence is generated according to a result of the ranking. In some embodiments, under the condition that the first playback type is the close-up camera position slow playback, frame interpolation processing at a slow motion rate is performed on the playback sequence to generate a slow playback sequence. Under the condition that a camera position corresponding to the playback sequence is a high-speed camera, the frame interpolation processing is not required.

In some embodiments, under the condition that the playback type is the second playback type, after a video stream located between $s_i$ and $e_i$ of the at least one second auxiliary camera position of the area is acquired as a playback video stream, the at least one playback sequence is generated according to the at least one playback video stream. For example, a corresponding playback sequence is generated according to a starting frame identification and an ending frame identification of each playback video stream, and its corresponding camera position identification.

Then, after the at least one playback sequence is generated, the initial local sequence is extended by using the at least one playback sequence.

For example, after the ending frame identification of the initial local sequence, as many playback sequences as possible are concatenated to obtain the local sequence. In some embodiments, after the initial local sequence is extended by using the extension sequence, concatenating as many playback sequences as possible can also be continued, to obtain the local sequence.

Returning to FIG. 1, after the local sequence of each reference event frame interval is determined, the step S40 is performed.

In the step S40, the broadcast directing sequence is generated according to the local sequence.

For example, the local sequence is merged to obtain the broadcast directing sequence.

In some embodiments, a supplement sequence is generated under the condition that the ending frame identification $E_i$ of the local sequence of the ith reference event frame interval is non-adjacent to the starting frame identification $S_{i+1}$ of the local sequence of the (i+1)th reference event frame interval. The supplement sequence comprises a camera position and a frame identification of each frame image located between $E_i$ and $S_{i+1}$, the camera position of each frame image located between $E_i$ and $S_{i+1}$ being a third auxiliary camera position. Further, each local sequence and the supplement sequence are merged to obtain the broadcast directing sequence.

In the step S50, the broadcast directing video is generated according to the broadcast directing sequence and the video stream of the camera position corresponding to the camera position identification of the broadcast directing sequence. In some embodiments, the frame image corresponding to the broadcast directing sequence is acquired according to the broadcast directing sequence and the video stream of the position corresponding to the camera position identification of the broadcast directing sequence. Further, the frame image is encoded to obtain the broadcast directing video.

For example, after a video stream from each camera is acquired through a video input interface, the video stream is stored in a buffer, and after the broadcast directing sequence is obtained, an image with a corresponding frame identification is acquired from the video stream of the corresponding camera position in the buffer, according to a camera position identification of each frame image provided by the broadcast directing sequence and a frame identification corresponding to the camera position identification, and each frame image is sequentially encoded to obtain the broadcast directing video.

In some embodiments, the broadcast directing video is output through a video output interface for live-streaming.

Figure 8:
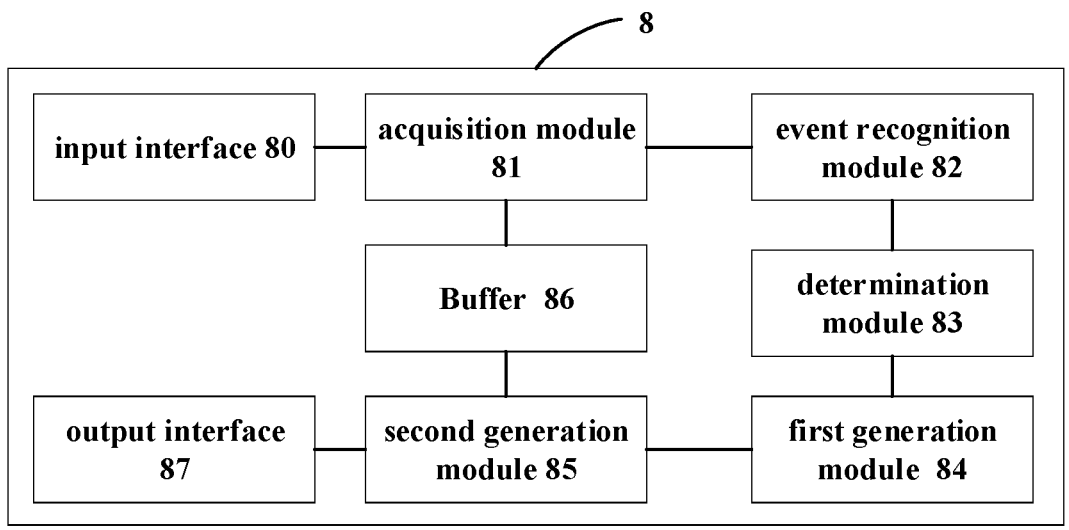
FIG. 8 is a block diagram illustrating a broadcast directing apparatus according to some embodiments of the present disclosure.

FIG. 8 is a block diagram illustrating a broadcast directing apparatus according to some embodiments of the present disclosure.

As shown in FIG. 8, the broadcast directing apparatus 8 comprises an acquisition module 81, an event recognition module 82, a determination module 83, a first generation module 84, and a second generation module 85.

The acquisition module 81 is configured to acquire a reference video stream from a reference camera position, for example, performing the step S10 shown in FIG. 1.

In some embodiments, the broadcast directing apparatus 8 further comprises an input interface 80. The acquisition module 81 acquires the reference video stream from the reference camera position through the input interface 80.

The event recognition module 82 is configured to perform event recognition on the reference video stream to obtain at least one reference event frame interval, for example, performing the step S20 shown in FIG. 1. Each reference event frame interval corresponds to an unique event. Each reference event frame interval comprises frame identifications of a plurality of successive images where a same event occurs.

The determination module 83 is configured to determine a local sequence of each reference event frame interval according to a correspondence relationship between the event and a camera position identification, for example, performing the step S30 shown in FIG. 1. The local sequence comprises a camera position identification of each frame image of a video to be played corresponding to the reference event frame interval and a frame identification corresponding to the camera position identification.

The first generation module 84 is configured to generate a broadcast directing sequence according to the local sequence, for example, performing the step S40 as shown in FIG. 1.

The second generation module 85 is configured to generate a broadcast directing video according to the broadcast directing sequence and a video stream of a camera position corresponding to the camera position identification of the broadcast directing sequence, for example, performing the step S50 as shown in FIG. 1.

In some embodiments, the broadcast directing apparatus 8 further comprises a buffer 86. The buffer 86 is configured to store the video stream of the corresponding camera position. For example, the acquisition module 81 can acquire the video stream of the camera position through the input interface 80 corresponding to the input interface and buffer the video stream in the buffer 86.

In some embodiments, the broadcast directing apparatus 8 further comprises an output interface 87. The second generation module 85 outputs the broadcast directing video for live-streaming through the output interface 87.

Figure 9:
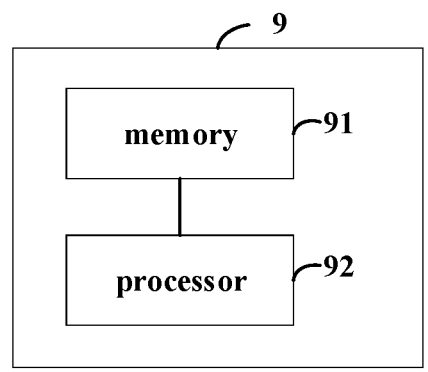
FIG. 9 is a block diagram illustrating a broadcast directing apparatus according to other embodiments of the present disclosure.

FIG. 9 is a block diagram illustrating a broadcast directing apparatus according to other embodiments of the present disclosure.

As shown in FIG. 9, the broadcast directing apparatus 9 comprises a memory 91; and a processor 92 coupled to the memory 91. The memory 91 is configured to store instructions for performing corresponding embodiments of the broadcast directing method. The processor 92 is configured to perform, based on the instructions stored in the memory 91, the broadcast directing method in any of the embodiments of the present disclosure.

Figure 10:
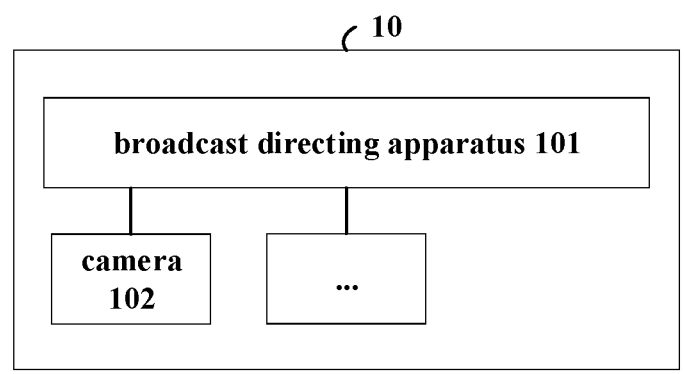
FIG. 10 is a block diagram illustrating a broadcast directing system according to some embodiments of the present disclosure.

FIG. 10 is a block diagram illustrating a broadcast directing system according to some embodiments of the present disclosure.

As shown in FIG. 10, the broadcast directing system 10 comprises a broadcast directing apparatus 101 and at least one camera 102. The broadcast directing apparatus 101 is the broadcast directing apparatus in any of the embodiments of the present disclosure. The broadcast directing apparatus 101 is configured to perform the broadcast directing method in any of the embodiments of the present disclosure.

The at least one camera 102 is configured to generate a video stream and transmit the video stream to the broadcast directing apparatus. One camera corresponds to one camera position and has an unique camera position identification. The video stream includes, but is not limited to, a reference video stream and a video stream of a corresponding camera position.

Figure 11:
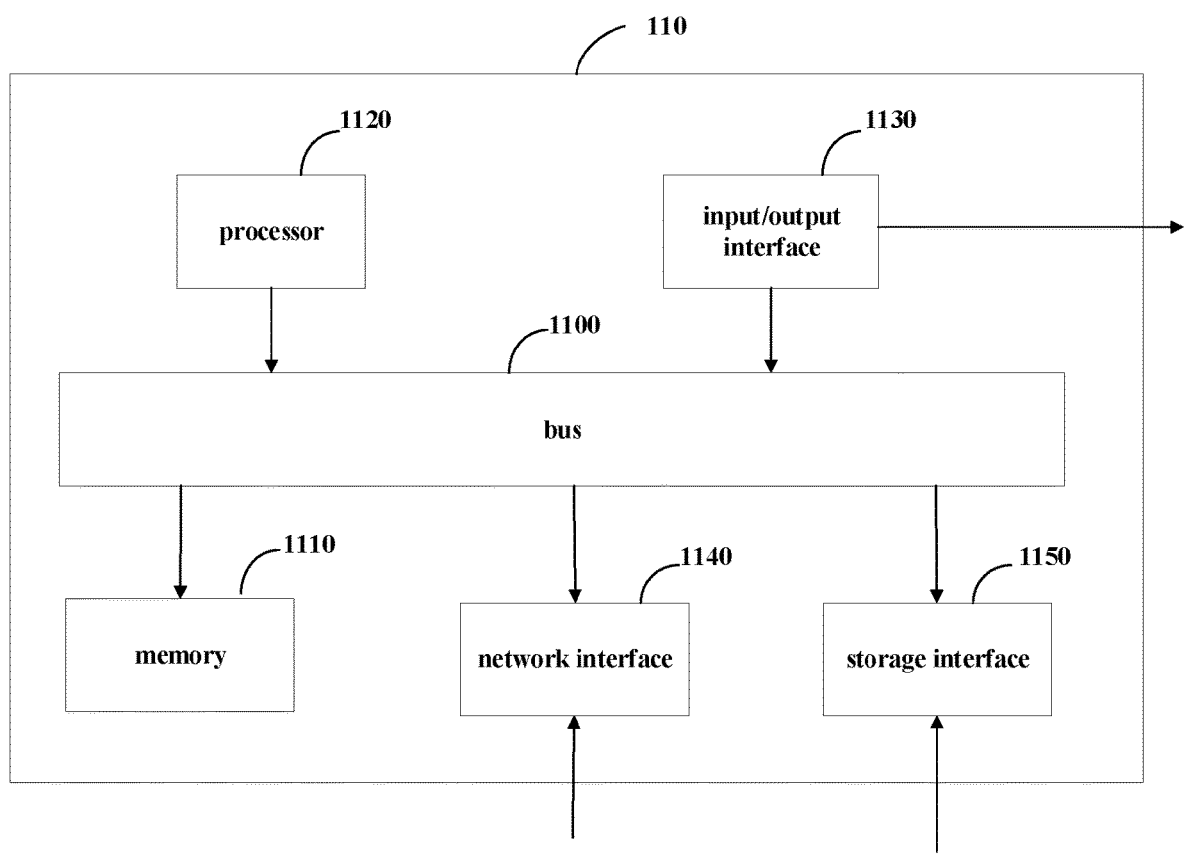
FIG. 11 is a block diagram illustrating a computer system for implementing some embodiments of the present disclosure.

FIG. 11 is a block diagram illustrating a computer system for implementing some embodiments of the present disclosure.

As shown in FIG. 11, the computer system 110 can be embodied in a form of a general-purpose computing device. The computer system 110 comprises a memory 1110, a processor 1120, and a bus 1100 connecting different system components.

The memory 1110 can include, for example, a system memory, a non-volatile storage medium, and the like. The system memory has thereon stored, for example, an operating system, application, boot loader, other programs, and the like. The system memory can include a volatile storage medium, for example, a random access memory (RAM) and/or cache memory. The non-volatile storage medium has thereon stored, for example, instructions for performing corresponding embodiments of at least one of the broadcast directing methods. The non-volatile storage medium includes, but is not limited to, a magnetic disk memory, optical memory, flash memory, and the like.

The processor 1120 can be implemented by a discrete hardware component, such as a general-purpose processor, digital signal processor (DSP), application specific integrated circuit (ASIC), field programmable gate array (FPGA) or other programmable logic devices, discrete gate or transistor, and the like. Accordingly, each module such as the judgment module and the determination module can be implemented by a central processing unit (CPU) executing instructions in a memory that perform corresponding steps, or can be implemented by a dedicated circuit performing the corresponding steps.

The bus 1100 can employ any of a variety of bus architectures. For example, the bus architecture includes, but is not limited to, an industry standard architecture (ISA) bus, micro channel architecture (MCA) bus, and peripheral component interconnect (PCI) bus.

The computer system 110 can further comprise an input/output interface 1130, network interface 1140, storage interface 1150, and the like. These interfaces 1130, 1140, 1150 as well as the memory 1110 and the processor 1120 can be connected through the bus 1100. The input/output interface 1130 can provide a connection interface for input/output devices such as a display, a mouse, and a keyboard. The network interface 1140 provides a connection interface for various networking devices. The storage interface 1150 provides a connection interface for external storage devices such as a floppy disk, a USB disk, and an SD card.

Various aspects of the present disclosure are described herein with reference to the flow diagrams and/or block diagrams of the method, device and computer program product according to the embodiments of the present disclosure. It should be understood that each block of the flow diagrams and/or block diagrams, and a combination of the blocks, can be implemented by non-transitory computer-readable program instructions.

These non-transitory computer-readable program instructions can be provided to a processor of a general-purpose computer, special-purpose computer, or other programmable devices to produce a machine, such that the instructions, which are executed by the processor, create means for implementing the functions specified in one or more blocks in the flow diagrams and/or block diagrams.

These non-transitory computer-readable program instructions can also be stored in a non-transitory computer-readable memory, and these instructions cause a computer to work in a specific manner, thereby producing an article of manufacture, which includes instructions for implementing the functions specified in one or more blocks in the flow diagrams and/or block diagrams.

The present disclosure can take a form of an entire hardware embodiment, an entire software embodiment or an embodiment combining software and hardware aspects.

By means of the broadcast directing method, apparatus and system, and the non-transitory computer-storable medium in the above embodiments, the labor cost is reduced, and the real-time performance and accuracy of the broadcast directing are improved.

So far, the broadcast directing method, apparatus and system, and the non-transitory computer-readable storage medium according to the present disclosure have been described in detail. Some details well known in the art have not been described in order to avoid obscuring the concepts of the present disclosure. Those skilled in the art can now fully appreciate how to implement the technical solutions disclosed herein, in view of the foregoing description.

What is claimed is:

1. A broadcast directing method, comprising:
acquiring a reference video stream from a reference camera position;
performing event recognition on the reference video stream to obtain at least one reference event frame interval, each reference event frame interval corresponding to a unique event, and each reference event frame interval comprising frame identifications of a plurality of successive images where a same event occurs;
determining a local sequence of each reference event frame interval according to a correspondence relationship between the event and a camera position identification, the local sequence comprising a camera position identification of each frame image of a video to be played corresponding to the reference event frame interval and a frame identification corresponding to the camera position identification;
generating a broadcast directing sequence according to the local sequence; and
generating a broadcast directing video according to the broadcast directing sequence and a video stream of a camera position corresponding to the camera position identification of the broadcast directing sequence;
wherein the at least one reference event frame interval comprises an ith reference event frame interval, i being a positive integer, and
the determining a local sequence of each reference event frame interval according to a correspondence relationship between the event and a camera position identification comprises:
determining an initial local sequence of the ith reference event frame interval according to the correspondence relationship between the event and the camera position identification, a starting frame identification and an ending frame identification of the initial local sequence being a starting frame identification and an ending frame identification of the ith reference event frame interval, respectively;
acquiring a video stream from at least one first auxiliary camera position; and
extending the initial local sequence of the ith reference event frame interval by using the video stream from the at least one first auxiliary camera position, to obtain the local sequence of the ith reference event frame interval;
wherein the at least one reference event frame interval further comprises an (i+1)th reference event frame interval, the starting frame identification and the ending frame identification of the ith reference event frame interval being $s_i$ and $e_i$ respectively, and a starting frame identification of the (i+1)th reference event frame interval being $s_{i+1}$, and
the extending the initial local sequence of the ith reference event frame interval comprises:
for the case where i is equal to 1, under the condition that there is at least one of $s_i$ and 1 being non-adjacent or $e_i$ and $s_{i+1}$ being non-adjacent, acquiring at least one of a video stream between $s_i$ and 1 or a video stream between $e_i$ and $s_{i+1}$, from the at least one first auxiliary camera position, as an extension video stream; and
extending the initial local sequence of the ith reference event frame interval by using the extension video stream, to obtain the local sequence of the ith reference event frame interval;
and/or
wherein the at least one reference frame interval further comprises an (i−1)th reference event frame interval, an ending frame identification of the local sequence of the (i−1)th reference event frame interval being $E_{i-1}$, and
the extending the initial local sequence of the ith reference event frame interval comprises:
for the case where i is greater than 1, under the condition that there is at least one of non-adjacent $s_i$ and $E_{i-1}$ or non-adjacent $e_i$ and $s_{i+1}$, acquiring at least one of a video stream between $s_i$ and $E_{i-1}$ or a video stream between $e_i$ and $s_{i+1}$, from the at least one first auxiliary camera position, as an extension video stream; and
extending the initial local sequence of the ith reference event frame interval by using the extension video stream, to obtain the local sequence of the ith reference event frame interval.

2. The broadcast directing method according to claim 1, wherein the extension video stream is a multipath extension video stream, the multipath extension video stream is from a plurality of first auxiliary camera positions, and
the extending the initial local sequence of the ith reference event frame interval comprises:
performing face recognition on each path of the multipath extension video stream to obtain at least one face frame interval corresponding to the path of the multipath extension video stream, each face frame interval corresponding to a unique face recognition result, and each face frame interval comprising frame identifications of a plurality of successive images with a same face recognition result;
generating at least one extension frame interval according to the face frame interval of the path of the multipath extension video stream, each extension frame interval comprising at least parts of a plurality of face frame intervals corresponding to different first auxiliary camera positions;

obtaining an extension sequence according to an extension frame interval with a highest number of corresponding first auxiliary camera positions and a highest total number of the frame in the at least one extension frame interval, the extension sequence comprising a camera position identification of each frame image of a video to be played corresponding to the extension frame interval and a frame identification corresponding to the camera position identification; and extending the initial local sequence of the ith reference event frame interval according to the extension sequence, to obtain the local sequence of the ith reference event frame interval.

3. The broadcast directing method according to claim 2, wherein the generating at least one extension frame interval according to the face frame interval of the path of the multipath extension video stream comprises:

for the multipath extension video stream of each first auxiliary camera position, determining a face frame interval adjacent to the ith reference event frame interval, as an initial extension frame interval;

starting from the face frame interval adjacent to the ith reference event frame interval, along a direction of a decrease or increase in frame identifications, concatenating at least a part of one face frame interval of another first auxiliary camera position than the first auxiliary camera position to the initial extension frame interval, to update the initial extension frame interval;

circularly updating the initial extension frame interval until there are no longer the face frame interval of the other first auxiliary camera position than the first auxiliary camera position corresponding to the initial extension frame interval; and determining the updated initial extension frame interval as the extension frame interval.

4. A broadcast directing method, comprising:

acquiring a reference video stream from a reference camera position;

performing event recognition on the reference video stream to obtain at least one reference event frame interval, each reference event frame interval corresponding to a unique event, and each reference frame interval comprising frame identifications of a plurality of successive images where a same event occurs;

determining a local sequence of each reference event frame interval according to a correspondence relationship between the event and a camera position identification, the local sequence comprising a camera position identification of each frame image of a video to be played corresponding to the reference event frame interval and a frame identification corresponding to the camera position identification;

generating a broadcast directing sequence according to the local sequence; and generating a broadcast directing video according to the broadcast directing sequence and a video stream of a camera position corresponding to the camera position identification of the broadcast directing sequence;

wherein the at least one reference event frame interval comprises an ith reference event frame interval and an (i+1)th reference event frame interval, i being an integer greater than or equal to 1, a starting frame identification and an ending frame identification of the ith reference event frame interval being $s_i$ and $e_i$ respectively, and a starting frame identification of the (i+1)th reference event frame interval being $s_{i+1}$, and the determining a local sequence of each reference event frame interval according to a correspondence relationship between the event and a camera position identification comprises:

determining an initial local sequence of the ith reference event frame interval according to the correspondence relationship between the event and the camera position identification, a starting frame identification and an ending frame identification of the initial local sequence being $s_i$ and $e_i$ respectively;

in the case of $e_i$ and $s_{i+1}$ being non-adjacent, determining a playback type according to the event corresponding to the ith reference event frame interval;

acquiring at least one path of playback video stream corresponding to the playback type; and extending the initial local sequence according to the at least one path of playback video stream, to obtain the local sequence of the ith reference event frame interval;

and/or wherein the at least one reference event frame interval comprises an ith reference event frame interval and an (i+1)th reference event frame interval, i being an integer greater than or equal to 1, and the generating a broadcast directing sequence comprises:

generating a supplement sequence under the condition that an ending frame identification $E_i$ of the local sequence of the ith reference event frame interval is non-adjacent to a starting frame identification $S_{i+1}$ of the local sequence of the (i+1)th reference event frame interval, the supplement sequence comprising a camera position and a frame identification of each frame image located between $E_i$ and $S_{i+1}$, and the camera position of each frame image located between $E_i$ and $S_{i+1}$ being a third auxiliary camera position; and merging the local sequence and the supplement sequence to obtain the broadcast directing sequence.

5. The broadcast directing method according to claim 4, wherein the extending the initial local sequence comprises:

generating at least one playback sequence according to the at least one path of playback video stream, each playback sequence comprising a camera position identification of each frame image located between $e_i$ and $s_{i+1}$ and a frame identification corresponding to the camera position identification; and extending the initial local sequence by using the at least one playback sequence.

6. The broadcast directing method according to claim 5, wherein the playback type comprises a first playback type, and the generating at least one playback sequence according to the at least one path of playback video stream comprises:

under the condition that the playback type is the first playback type, performing event recognition on the at least one path of playback video stream, to obtain at least one auxiliary event frame interval, the auxiliary event frame interval comprising frame identifications of a plurality of successive images where the event corresponding to the ith reference event frame interval occurs; and generating the at least one playback sequence according to the at least one auxiliary event frame interval.

7. The broadcast directing method according to claim 6, wherein the generating at least one playback sequence according to the at least one auxiliary event frame interval comprises:
   ranking the at least one auxiliary event frame interval according to a total number of the frame and a weight of each auxiliary event frame interval; and
   generating the at least one playback sequence according to a result of the ranking.

8. The broadcast directing method according to claim 4, wherein the playback type comprises a first playback type, and
   the acquiring at least one path of playback video stream corresponding to the playback type comprises:
   under the condition that the playback type is the first playback type, acquiring a video stream between $s_i$−m and $e_i$+n from the at least one first auxiliary camera position, as the at least one path of playback video stream, m and n being both integers greater than or equal to 0.

9. The broadcast directing method according to claim 4, wherein the playback type comprises a second playback type, and
   the acquiring at least one path of playback video stream corresponding to the playback type comprises:
   under the condition that the playback type is the second playback type, acquiring a camera position angle corresponding to each frame image between $s_i'$ and $e_i'$ according to the reference video stream;
   according to each camera position angle, determining an area where the event corresponding to the ith reference event frame interval occurs; and
   acquiring a video stream between $s_i$ and $e_i$ from at least one second auxiliary camera position in the area, as the at least one path of playback video stream.

10. The broadcast directing method according to claim 4, wherein the reference camera position is used for providing a close-up video stream of a dribbling player, the first auxiliary camera position is used for providing a close-up video stream at a different angle on a pitch, the second auxiliary camera position is used for providing a standard video stream at a different angle on the pitch, and the third auxiliary camera position is used for providing a standard video stream at a viewing angle of a spectator.

11. The broadcast directing method according to claim 1, wherein the generating a broadcast directing video comprises:
   acquiring the frame image corresponding to the broadcast directing sequence according to the broadcast directing sequence and the video stream of the camera position corresponding to the camera position identification of the broadcast directing sequence; and
   coding the frame image to obtain the broadcast directing video.

12. A broadcast directing system, comprising:
   a broadcast directing apparatus, comprising:
   a memory; and
   a processor coupled to the memory, the processor being configured to perform, based on instructions stored in the memory, a broadcast directing method, comprising:
      acquiring a reference video stream from a reference camera position;
      performing event recognition on the reference video stream to obtain at least one reference event frame interval, each reference event frame interval corresponding to a unique event, and each reference event frame interval comprising frame identifications of a plurality of successive images where a same event occurs;
      determining a local sequence of each reference event frame interval according to a correspondence relationship between the event and a camera position identification, the local sequence comprising a camera position identification of each frame image of a video to be played corresponding to the reference event frame interval and a frame identification corresponding to the camera position identification;
      generating a broadcast directing sequence according to the local sequence; and
      generating a broadcast directing video according to the broadcast directing sequence and a video stream of a camera position corresponding to the camera position identification of the broadcast directing sequence; and
   at least one camera configured to generate a video stream and transmit the video stream to the broadcast directing apparatus;
   wherein the at least one reference event frame interval comprises an ith reference event frame interval, i being a positive integer, and
   the determining a local sequence of each reference event frame interval according to a correspondence relationship between the event and a camera position identification comprises:
      determining an initial local sequence of the ith reference event frame interval according to the correspondence relationship between the event and the camera position identification, a starting frame identification and an ending frame identification of the initial local sequence being a starting frame identification and an ending frame identification of the ith reference event frame interval, respectively;
      acquiring a video stream from at least one first auxiliary camera position; and
      extending the initial local sequence of the ith reference event frame interval by using the video stream from the at least one first auxiliary camera position, to obtain the local sequence of the ith reference event frame interval;
   wherein the at least one reference event frame interval further comprises an (i+1)th reference event frame interval, the starting frame identification and the ending frame identification of the ith reference event frame interval being $s_i$ and $e_i$ respectively, and a starting frame identification of the (i+1)th reference event frame interval being $s_{i+1}$, and
   the extending the initial local sequence of the ith reference event frame interval comprises:
      for the case where i is equal to 1, under the condition that there is at least one of $s_i$ and 1 being non-adjacent or $e_i$ and $s_{i+1}$ being non-adjacent, acquiring at least one of a video stream between $s_i$ and 1 or a video stream between $e_i$ and $s_{i+1}$, from the at least one first auxiliary camera position, as an extension video stream; and
      extending the initial local sequence of the ith reference event frame interval by using the extension video stream, to obtain the local sequence of the ith reference event frame interval:
   and/or
   wherein the at least one reference frame interval further comprises an (i−1)th reference event frame interval, an ending frame identification of the local sequence of the (i−1)th reference event frame interval being $E_{i-1}$, and the extending the initial local sequence of the ith reference event frame interval comprises:

for the case where i is greater than 1, under the condition that there is at least one of non-adjacent $s_i$ and $E_{i-1}$ or non-adjacent $e_i$ and $s_{i+1}$, acquiring at least one of a video stream between $s_i$ and $E_{i-1}$ or a video stream between $e_i$ and $s_{i+1}$, from the at least one first auxiliary camera position, as an extension video stream; and extending the initial local sequence of the ith reference event frame interval by using the extension video stream, to obtain the local sequence of the ith reference event frame interval.

13. A non-transitory computer-storable medium having thereon stored computer program instructions which, when executed by a processor, implement a broadcast directing method according to claim 1.

14. A broadcast directing apparatus, comprising:

a memory; and a processor coupled to the memory, the processor being configured to perform, based on instructions stored in the memory, a broadcast directing method, comprising:

acquiring a reference video stream from a reference camera position;

performing event recognition on the reference video stream to obtain at least one reference event frame interval, each reference event frame interval corresponding to a unique event, and each reference event frame interval comprising frame identifications of a plurality of successive images where a same event occurs;

determining a local sequence of each reference event frame interval according to a correspondence relationship between the event and a camera position identification, the local sequence comprising a camera position identification of each frame image of a video to be played corresponding to the reference event frame interval and a frame identification corresponding to the camera position identification;

generating a broadcast directing sequence according to the local sequence; and generating a broadcast directing video according to the broadcast directing sequence and a video stream of a camera position corresponding to the camera position identification of the broadcast directing sequence;

wherein the at least one reference event frame interval comprises an ith reference event frame interval, i being a positive integer, and the determining a local sequence of each reference event frame interval according to a correspondence relationship between the event and a camera position identification comprises:

determining an initial local sequence of the ith reference event frame interval according to the correspondence relationship between the event and the camera position identification, a starting frame identification and an ending frame identification of the initial local sequence being a starting frame identification and an ending frame identification of the ith reference event frame interval, respectively;

acquiring a video stream from at least one first auxiliary camera position; and extending the initial local sequence of the ith reference event frame interval by using the video stream from the at least one first auxiliary camera position, to obtain the local sequence of the ith reference event frame interval;

wherein the at least one reference event frame interval further comprises an (i+1)th reference event frame interval, the starting frame identification and the ending frame identification of the ith reference event frame interval being $s_i$ and $e_i$ respectively, and a starting frame identification of the (i+1)th reference event frame interval being $s_{i+1}$, and the extending the initial local sequence of the ith reference event frame interval comprises:

for the case where i is equal to 1, under the condition that there is at least one of $s_i$ and 1 being non-adjacent or $e_i$ and $s_{i+1}$ being non-adjacent, acquiring at least one of a video stream between $s_i$ and 1 or a video stream between $e_i$ and $s_{i+1}$, from the at least one first auxiliary camera position, as an extension video stream; and extending the initial local sequence of the ith reference event frame interval by using the extension video stream, to obtain the local sequence of the ith reference event frame interval;

and/or wherein the at least one reference frame interval further comprises an (i−1)th reference event frame interval, an ending frame identification of the local sequence of the (i−1)th reference event frame interval being $E_{i-1}$, and the extending the initial local sequence of the ith reference event frame interval comprises:

for the case where i is greater than 1, under the condition that there is at least one of non-adjacent $s_i$ and $E_{i-1}$ or non-adjacent $e_i$ and $s_{i+1}$, acquiring at least one of a video stream between $s_i$ and $E_{i-1}$ or a video stream between $e_i$ and $s_{i+1}$, from the at least one first auxiliary camera position, as an extension video stream; and extending the initial local sequence of the ith reference event frame interval by using the extension video stream, to obtain the local sequence of the ith reference event frame interval.

15. The broadcast directing method according to claim 4, wherein the generating a broadcast directing video comprises:

acquiring the frame image corresponding to the broadcast directing sequence according to the broadcast directing sequence and the video stream of the camera position corresponding to the camera position identification of the broadcast directing sequence; and coding the frame image to obtain the broadcast directing video.

16. A broadcast directing apparatus, comprising:

a memory; and a processor coupled to the memory, the processor being configured to perform, based on instructions stored in the memory, the broadcast directing method according to claim 4.

17. A broadcast directing system, comprising:

a broadcast directing apparatus, comprising:

a memory; and a processor coupled to the memory, the processor being configured to perform, based on instructions stored in the memory, the broadcast directing method according to claim 4; and at least one camera configured to generate a video stream and transmit the video stream to the broadcast directing apparatus.

18. A non-transitory computer-storable medium having thereon stored computer program instructions which, when executed by a processor, implement the broadcast directing method according to claim 4.

* * * * *

UNITED STATES PATENT AND TRADEMARK OFFICE
CERTIFICATE OF CORRECTION

PATENT NO. : 12,096,084 B2
APPLICATION NO. : 17/999984
DATED : September 17, 2024
INVENTOR(S) : Chen et al.

It is certified that error appears in the above-identified patent and that said Letters Patent is hereby corrected as shown below:

In the Specification

Column 9, Line 31: Please correct "$c_{Ej}(k,z)$" to read -- $c_{E_i}(k,z)$ --

Column 10, Line 24: Please correct "$C_{ej}(2,e_i)$" to read -- $c_{e_i}(2,e_i)$ --

Signed and Sealed this
Tenth Day of December, 2024

Katherine Kelly Vidal
*Director of the United States Patent and Trademark Office*